(12) United States Patent
Yu et al.

(10) Patent No.: US 11,736,804 B2
(45) Date of Patent: Aug. 22, 2023

(54) METHOD AND APPARATUS FOR GENERATING HIGH DYNAMIC RANGE FRAME THROUGH WHITE BALANCE COMPENSATION THAT USES WHITE BALANCE GAIN TABLE GENERATED FROM COMBINING MULTIPLE SETS OF WHITE BALANCE GAIN SETTINGS

(71) Applicant: MEDIATEK INC., Hsin-Chu (TW)

(72) Inventors: Jen-Hung Yu, Hsinchu (TW); Ming-Chang Chuang, Hsinchu (TW); Po-Yu Yeh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/381,165

(22) Filed: Jul. 20, 2021

(65) Prior Publication Data

US 2022/0078324 A1 Mar. 10, 2022

Related U.S. Application Data

(60) Provisional application No. 63/075,243, filed on Sep. 7, 2020.

(51) Int. Cl.
*H04N 23/72* (2023.01)
*H04N 9/77* (2006.01)
*G06F 18/25* (2023.01)
*H04N 23/71* (2023.01)

(52) U.S. Cl.
CPC ........... *H04N 23/72* (2023.01); *G06F 18/251* (2023.01); *H04N 9/77* (2013.01); *H04N 23/71* (2023.01)

(58) Field of Classification Search
CPC ...... H04N 5/2352; H04N 5/2351; H04N 9/77; H04N 9/045; H04N 9/735; H04N 5/2355; H04N 23/72; H04N 23/71; H04N 23/10; H04N 23/741; H04N 23/88; G06K 9/6289; G06V 10/56; G06V 10/803; G06F 18/251
See application file for complete search history.

(56) References Cited

U.S. PATENT DOCUMENTS

| | | | |
|---|---|---|---|
| 7,365,778 B2 | 4/2008 | Takeshita | |
| 8,723,978 B2* | 5/2014 | Kwon | H04N 23/951 348/222.1 |
| 8,947,555 B2* | 2/2015 | Velarde | H04N 5/23267 348/223.1 |
| 9,030,574 B2* | 5/2015 | Takayama | H04N 9/735 348/223.1 |
| 9,516,290 B2* | 12/2016 | Lin | H04N 5/23229 |

(Continued)

FOREIGN PATENT DOCUMENTS

TW I606728 B 11/2017

*Primary Examiner* — Luong T Nguyen
(74) *Attorney, Agent, or Firm* — Winston Hsu

(57) ABSTRACT

An image processing method includes: analyzing, by a white balance gain estimation circuit, a plurality of exposure frames with different exposures to generate a plurality of sets of white balance gain settings; combining the plurality of sets of white balance gain settings to generate a white balance gain table; applying the white balance gain table to the plurality of exposure frames to generate a plurality of white balance compensated frames; and generating a high dynamic range (HDR) frame by performing pixel fusion according to pixel data derived from the plurality of white balance compensated frames.

8 Claims, 14 Drawing Sheets

(56) References Cited

U.S. PATENT DOCUMENTS

2012/0262600 A1* 10/2012 Velarde .............. H04N 23/6811
348/223.1
2017/0359498 A1* 12/2017 Benchemsi .......... H04N 5/2356
2021/0392274 A1* 12/2021 Sendik ................... H04N 9/735

* cited by examiner

METHOD AND APPARATUS FOR GENERATING HIGH DYNAMIC RANGE FRAME THROUGH WHITE BALANCE COMPENSATION THAT USES WHITE BALANCE GAIN TABLE GENERATED FROM COMBINING MULTIPLE SETS OF WHITE BALANCE GAIN SETTINGS

CROSS REFERENCE TO RELATED APPLICATIONS

This application claims the benefit of U.S. Provisional application No. 63/075,243, filed on Sep. 7, 2020 and incorporated herein by reference.

BACKGROUND

The present invention relates to image processing, and more particularly, to a method and apparatus of generating a high dynamic range (HDR) frame through white balance compensation that uses a white balance gain table generated from combining multiple sets of white balance gain settings.

Conventional camera preview and photography under more than two light sources in a high contrast scene suffers from incorrect white balance for one of the light sources or all light sources. Conventional method usually applies a global white balance gain for the full image frame to compensate one light source, but usually ruins the part under the other light source. Or another conventional method is to adjust a global white balance gain between two or more light sources, but each light source is therefore not well balanced.

Thus, there is a need for an innovative image processing design that is capable of generating a high dynamic range (HDR) frame with each light source well balanced.

SUMMARY

One of the objectives of the claimed invention is to provide a method and apparatus of generating a high dynamic range (HDR) frame through white balance compensation that uses a white balance gain table generated from combining multiple sets of white balance gain settings.

According to a first aspect of the present invention, an exemplary image processing method is disclosed. The exemplary image processing method includes: analyzing, by a white balance gain estimation circuit, a plurality of exposure frames with different exposures to generate a plurality of sets of white balance gain settings; combining the plurality of sets of white balance gain settings to generate a white balance gain table; applying the white balance gain table to the plurality of exposure frames to generate a plurality of white balance compensated frames; and generating a high dynamic range (HDR) frame according to pixel data derived from the plurality of white balance compensated frames.

According to a second aspect of the present invention, an exemplary image processing method is disclosed. The exemplary image processing method includes: analyzing, by a white balance gain estimation circuit, a plurality of exposure frames with different exposures to generate a plurality of sets of white balance gain settings; combining the plurality of sets of white balance gain settings to generate a white balance gain table; and applying the white balance gain table to a high dynamic range (HDR) frame to generate a white balance compensated HDR frame.

According to a third aspect of the present invention, an exemplary image processing apparatus is disclosed. The exemplary image processing apparatus includes a white balance gain estimation circuit, a white balance compensation circuit, and a pixel fusion circuit. The white balance gain estimation circuit is arranged to analyze a plurality of exposure frames with different exposures to generate a plurality of sets of white balance gain settings, and combine the plurality of sets of white balance gain settings to generate a white balance gain table. The white balance compensation circuit is arranged to apply the white balance gain table to the plurality of exposure frames to generate a plurality of white balance compensated frames. The pixel fusion circuit is arranged to generate a high dynamic range (HDR) frame by performing pixel fusion according to pixel data derived from the plurality of white balance compensated frames.

According to a fourth aspect of the present invention, an exemplary image processing apparatus is disclosed. The exemplary image processing apparatus includes a white balance gain estimation circuit and a white balance compensation circuit. The white balance gain estimation circuit is arranged to analyze a plurality of exposure frames with different exposures to generate a plurality of sets of white balance gain settings, and combine the plurality of sets of white balance gain settings to generate a white balance gain table. The white balance compensation circuit is arranged to apply the white balance gain table to a high dynamic range (HDR) frame to generate a white balance compensated HDR frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
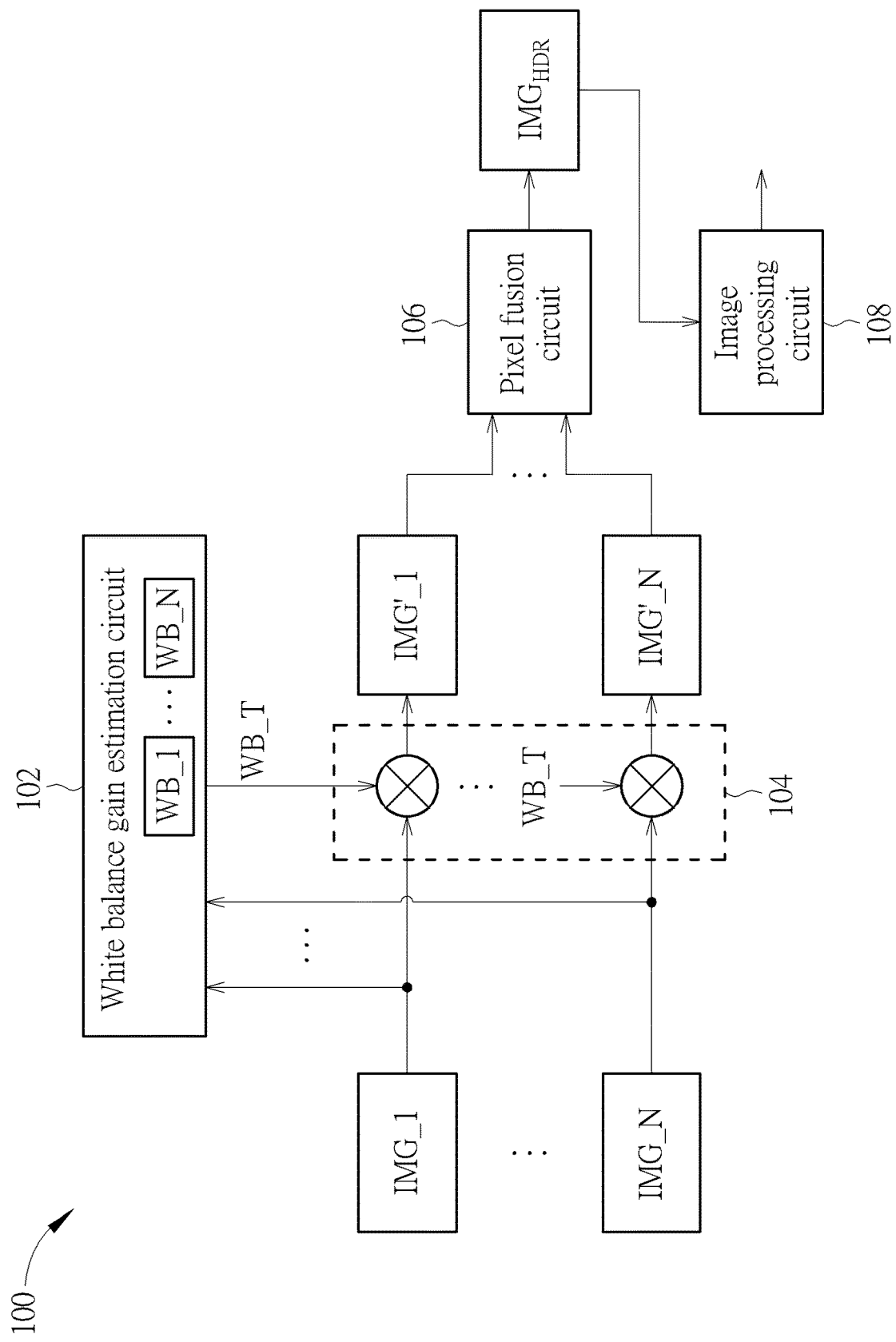
FIG. 1 is a block diagram illustrating a first image processing apparatus according to an embodiment of the present invention.

FIG. 1 is a block diagram illustrating a first image processing apparatus according to an embodiment of the present invention. The image processing apparatus 100 includes a white balance gain estimation circuit 102, a white balance compensation circuit 104, a pixel fusion circuit 106, and an image processing circuit 108. The white balance gain estimation circuit 102 is arranged to analyze a plurality of raw frames with different exposures (e.g., N exposure frames IMG_1-IMG_N with different exposures, where N is a positive integer not smaller than 2) to generate a plurality of sets of white balance gain settings (e.g., N sets of white balance gain settings WB_1-WB_N), and combine the sets of white balance gain settings to generate one white balance gain table WB_T. For example, each raw frame may be a 10-bit image with a bit depth equal to 10. In this embodiment, the white balance gain estimation circuit 102 obtains one set of white balance gain settings WB_n for one exposure frame IMG_n (1≤n≤N). For example, the white balance gain estimation circuit 102 may obtain statistics of different color components (R, G, B) in the exposure frame IMG_n, and generate one set of white balance gain settings WB_n according to the statistics of color components (R, G, B) in the exposure frame IMG_n.

Figure 2:
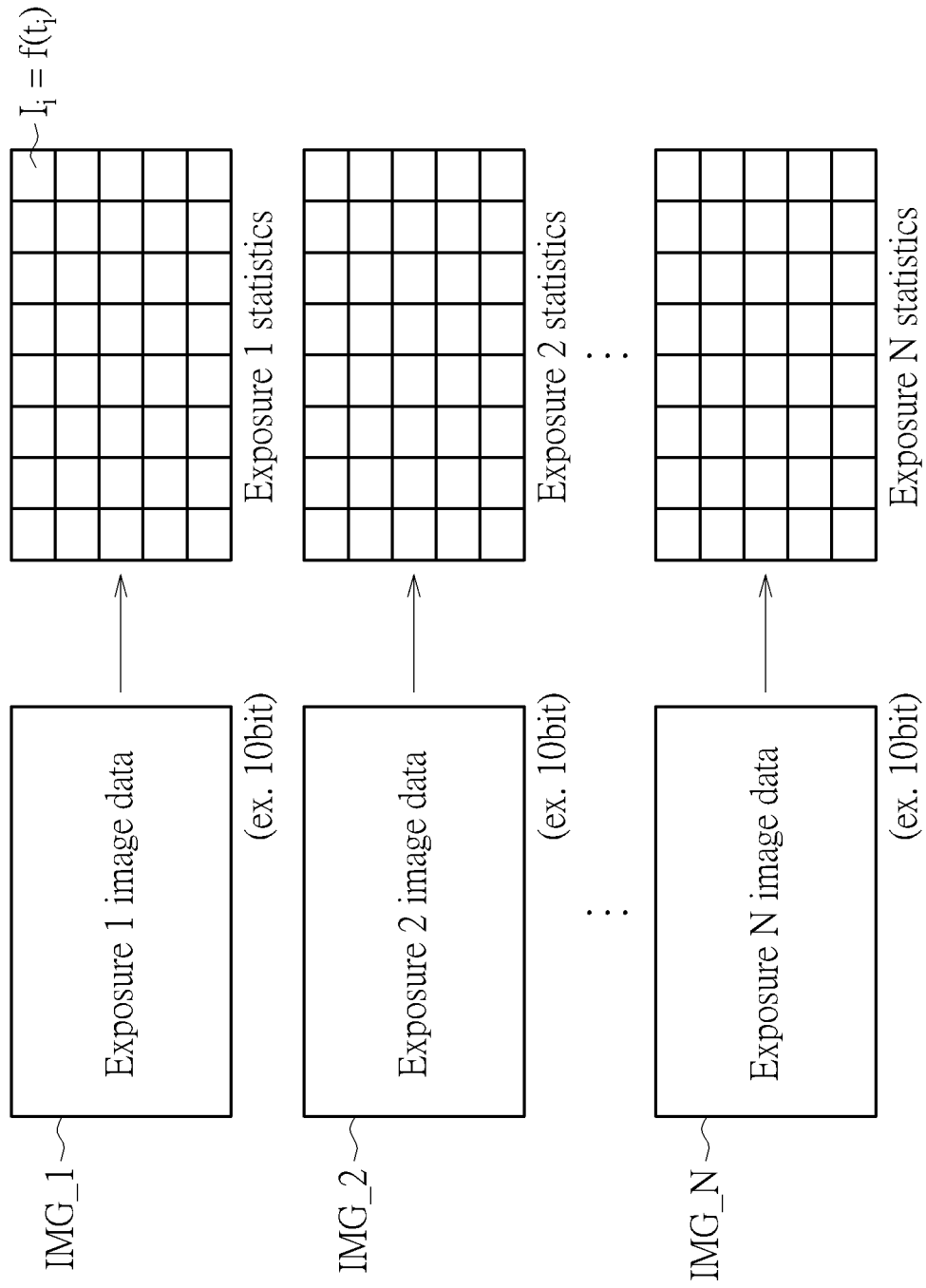
FIG. 2 is a diagram illustrating statistics of different color components in exposure frames according to an embodiment of the present invention.

FIG. 2 is a diagram illustrating statistics of different color components (R, G, B) in exposure frames IMG_1-IMG_N according to an embodiment of the present invention. At the exposure time $t_i$, one statistics data (R, G, B) $I_i$ of each block region in each exposure frame IMG_n (1≤n≤N) is obtained by the white balance gain estimation circuit 102. The exposure frames IMG_1, IMG_2, . . . , IMG_N with different exposures may be derived from capturing a same scene illuminated by multiple light sources with different intensity. The white balance gain estimation circuit 102 analyzes N exposure frames IMG_1-IMG_N to obtain N sets of white balance gain settings WB_1-WB_N, respectively, where statistics of different color components (R, G, B) in each exposure frame IMG_n is used for determining one corresponding set of white balance gain settings WB_n. Hence, one set of white balance gain settings WB_n is associated with white balance compensation for an exposure condition in which a sensor module captures one exposure frame.

Figure 3:
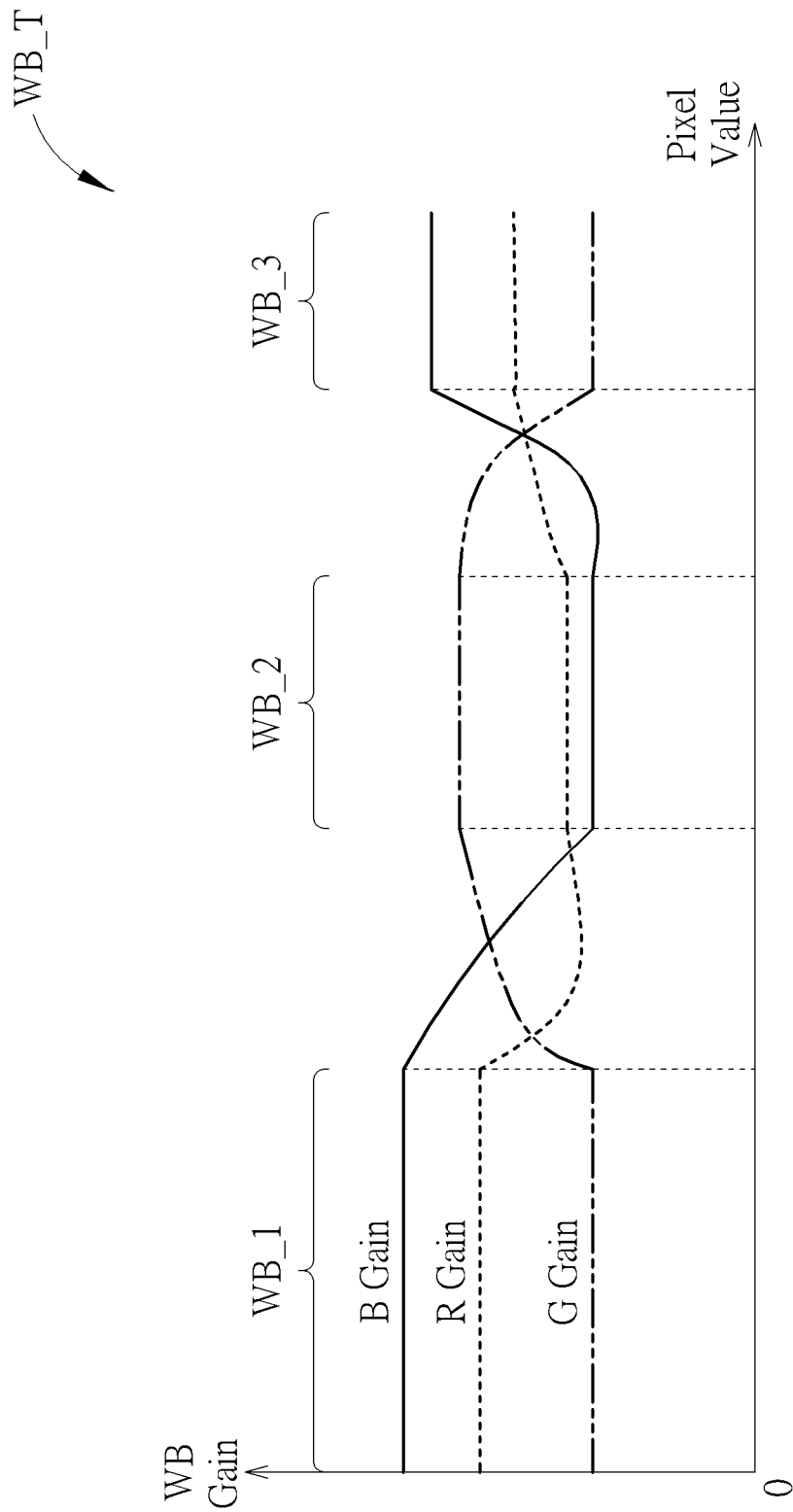
FIG. 3 is a diagram illustrating a first example of a white balance gain table generated from a white balance gain estimation circuit.

After N sets of white balance gain settings WB_1-WB_N are available, the white balance gain estimation circuit 102 combines N sets of white balance gain settings WB_1-WB_N to generate one white balance gain table WB_T. FIG. 3 is a diagram illustrating a first example of the white balance gain table WB_T generated from the white balance gain estimation circuit 102. The white balance gain table WB_T records mapping between pixel values and white balance (WB) gain values for different color components (R, G, B). Hence, according to the white balance gain table WB_T, a pixel value of one color component R/G/B is mapped to one WB gain R gain/G gain/B gain for the color component R/G/B. Assuming that the number of exposure frames is equal to 3 (i.e., N=3) and a scene captured by a sensor module is illuminated by multiple light sources with different intensity, a first set of white balance gain settings WB_1 may be obtained for a first exposure setting, a second set of white balance gain settings WB_2 may be obtained for a second exposure setting, and a third set of white balance gain settings WB_3 may be obtained for a third exposure setting. To obtain a complete white balance gain table WB_T, the white balance gain estimation circuit 102 may employ a proper algorithm to add white balance gain settings for one transition between the first set of white balance gain settings WB_1 and the second set of white balance gain settings WB_2, and add white balance gain settings for another transition between the second set of white balance gain settings WB_2 and the third set of white balance gain settings WB_3.

Figure 4:
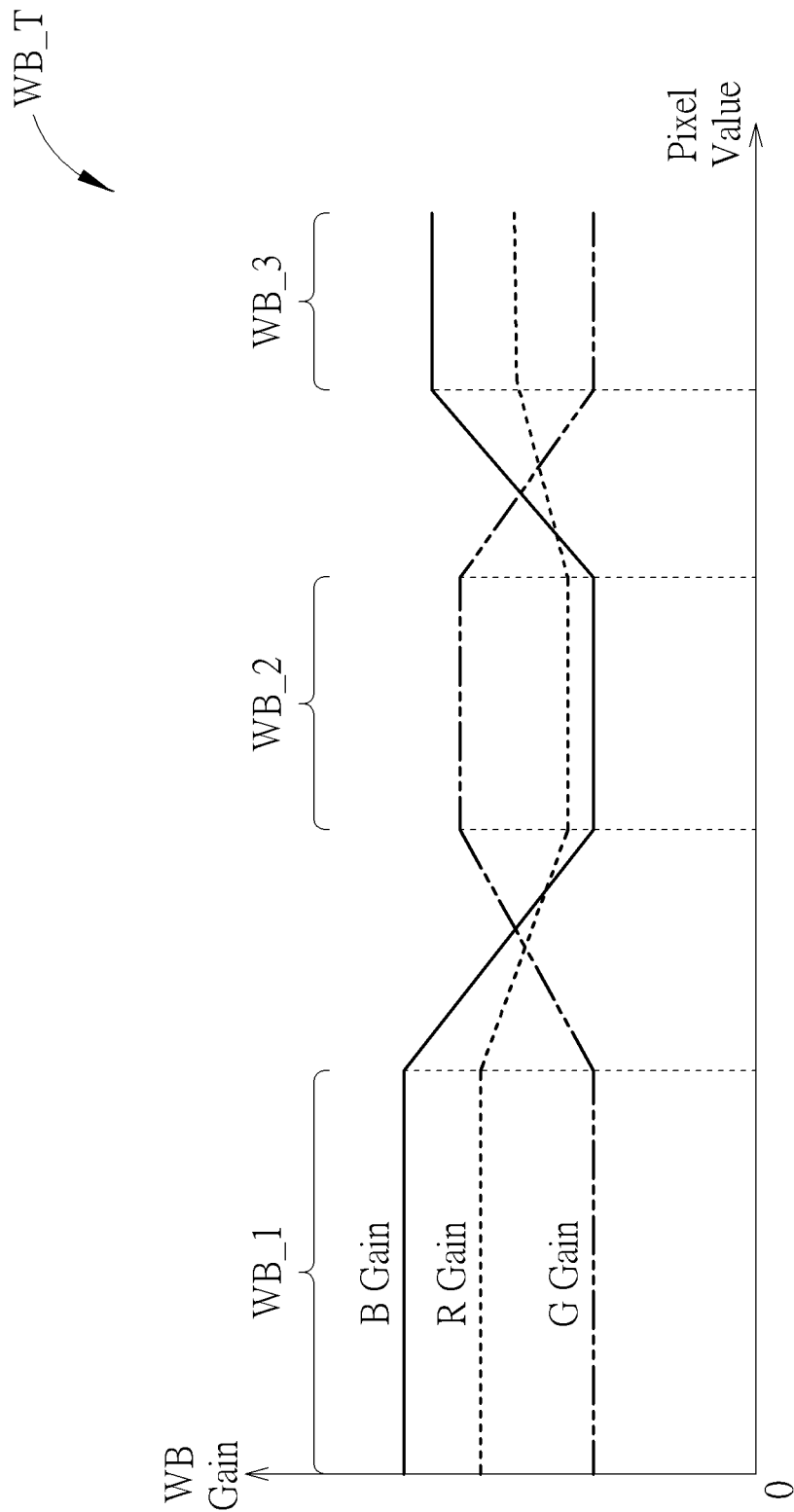
FIG. 4 is a diagram illustrating a second example of the white balance gain table generated from the white balance gain estimation circuit.
Figure 5:
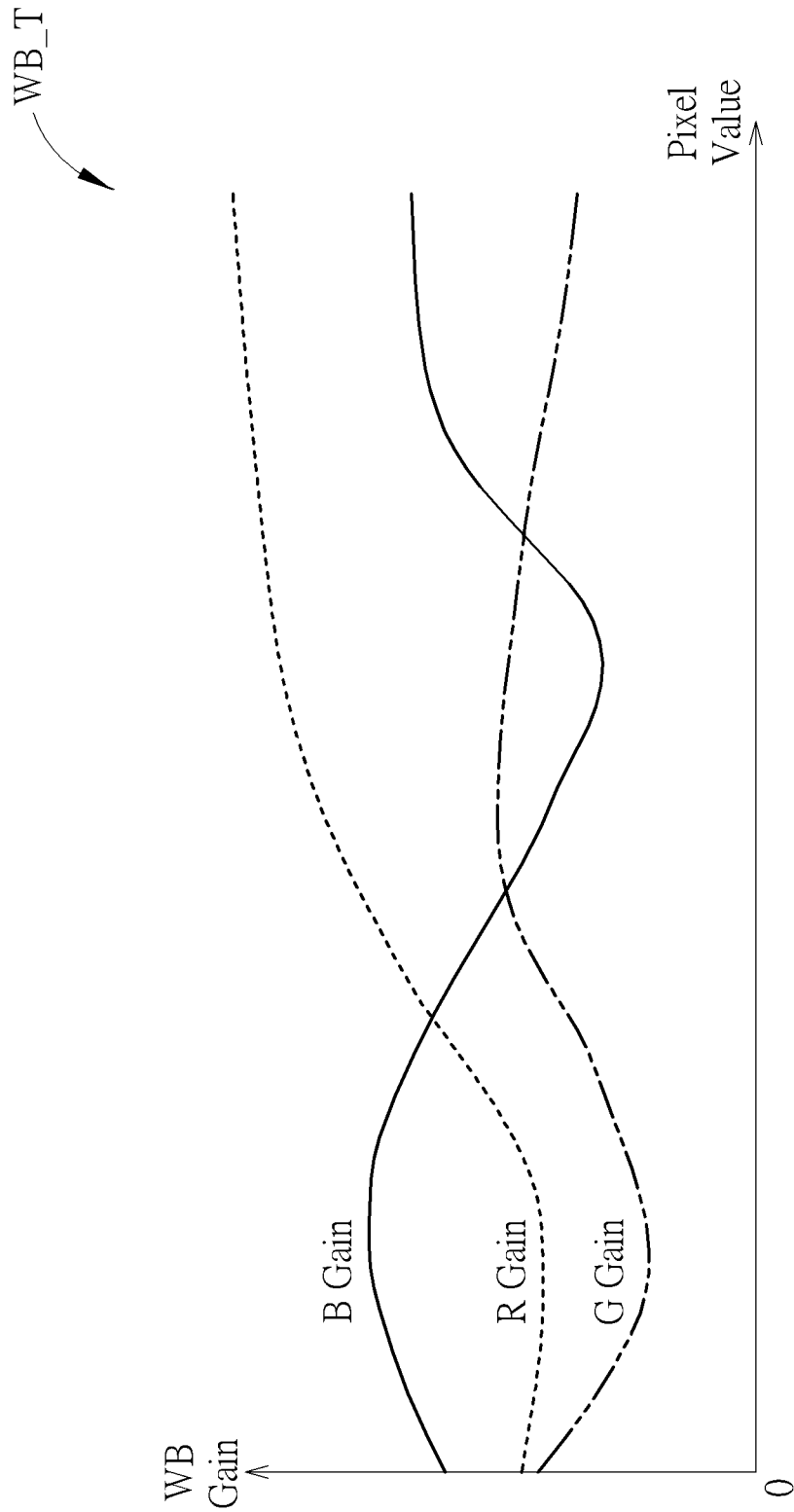
FIG. 5 is a diagram illustrating a third example of the white balance gain table generated from the white balance gain estimation circuit.

The mapping between pixel values and WB gain values shown in FIG. 3 is for illustrative purposes only, and is not meant to be a limitation of the present invention. FIG. 4 is a diagram illustrating a second example of the white balance gain table WB_T generated from the white balance gain estimation circuit 102. FIG. 5 is a diagram illustrating a third example of the white balance gain table WB_T generated from the white balance gain estimation circuit 102. To put it simply, the present invention has no limitations on how to combine multiple sets of white balance gain settings WB_1-WB_N. In practice, any means capable of deriving one white balance gain table WB_T from multiple sets of white balance gain settings WB_1-WB_N obtained from exposure frames with different exposures may be employed by the white balance gain estimation circuit 102.

Figure 6:
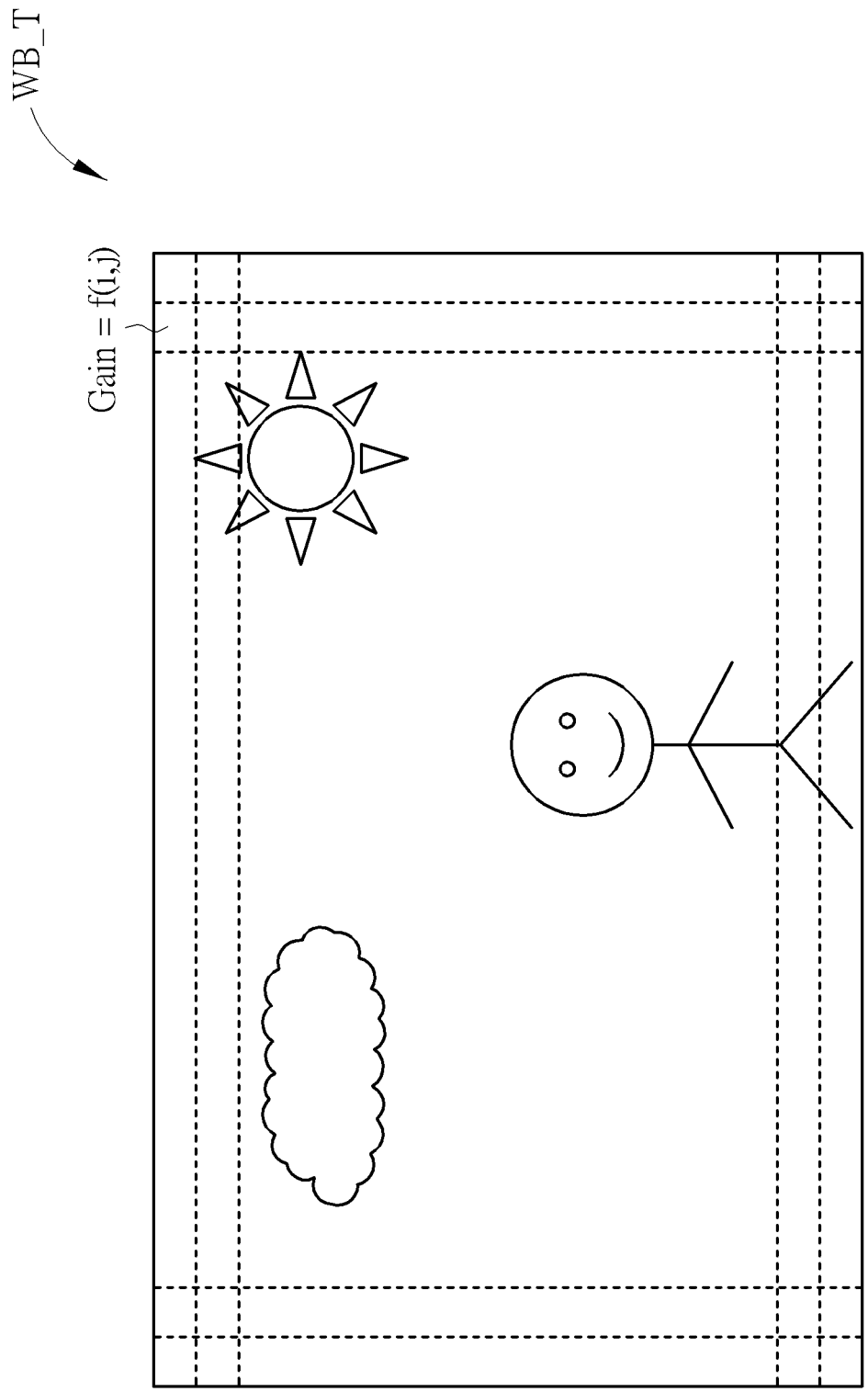
FIG. 6 is a diagram illustrating a fourth example of the white balance gain table generated from the white balance gain estimation circuit.

As mentioned above, the white balance gain estimation circuit 102 obtains one set of white balance gain settings WB_n for one exposure frame IMG_n (1≤n≤N) through analyzing the exposure frame IMG_n. In above examples, the white balance gain estimation circuit 102 may obtain statistics of different color components (R, G, B) in the exposure frame IMG_n, and generate one set of white balance gain settings WB_n according to the statistics of color components (R, G, B) in the exposure frame IMG_n. However, this is for illustrative purposes only, and is not meant to be a limitation of the present invention. For another example, the white balance gain estimation circuit 102 may perform feature extraction upon the exposure frame IMG_n (1≤n≤N) to obtain features in the exposure frame IMG_n, and generate a set of white balance gain settings WB_n according to the features in the exposure frame IMG_n, where each feature is content-aware information related to an image content of the exposure frame IMG_n. After N sets of white balance gain settings WB_1-WB_N are available, the white balance gain estimation circuit 102 combines N sets of white balance gain settings WB_1-WB_N to generate one white balance gain table WB_T. FIG. 6 is a diagram illustrating a fourth example of the white balance gain table WB_T generated from the white balance gain estimation circuit 102. The white balance gain table WB_T records the mapping between image features and white balance gain settings. Hence, a white balance gain setting Gain for each pixel (or each block region) at a location (i, j) depends on the image feature f(i, j) extracted from the pixel (or block region) at the location (i, j).

In some embodiments of the present invention, statistics of different color components (R, G, B) and image features in the exposure frame IMG_n may be jointly considered for determining a corresponding set of white balance gain settings WB_n. This alternative design also falls within the scope of the present invention.

Please refer to FIG. 1 again. The white balance gain table WB_T generated by the white balance gain estimation circuit 102 is provided to the white balance compensation circuit 104. The white balance compensation circuit 104 is arranged to apply the white balance gain table WB_T to the exposure frames IMG_1-IMG_N to generate a plurality of white balance compensated frames IMG'_1-IMG'_N, respectively, where multiple light sources in different intensity may be compensated in accordance with the white balance gain table WB_T that is generated from combining multiple sets of white balance gain settings obtained from analyzing respective exposure frames with different exposures. The pixel fusion circuit 106 is arranged to generate a high dynamic range (HDR) frame $IMG_{HDR}$ by performing pixel fusion according to pixel data derived from the white balance compensated frames IMG'_1-IMG'_N with each light source well balanced. For example, the HDR frame may be an 18-bit image with a bit depth equal to 18, or a 20-bit image with a bit depth equal to 20. In one exemplary design, the pixel fusion circuit 106 may blend the white balance compensated frames IMG'_1-IMG'_N directly. In another exemplary design, the pixel fusion circuit 106 may blend the white balance compensated frames IMG'_1-IMG'_N after the white balance compensated frames IMG'_1-IMG'_N undergo certain image enhancement processing. The image processing circuit 108 is arranged to deal with the remaining image processing and generate an HDR output of the image processing apparatus 100.

Figure 7:
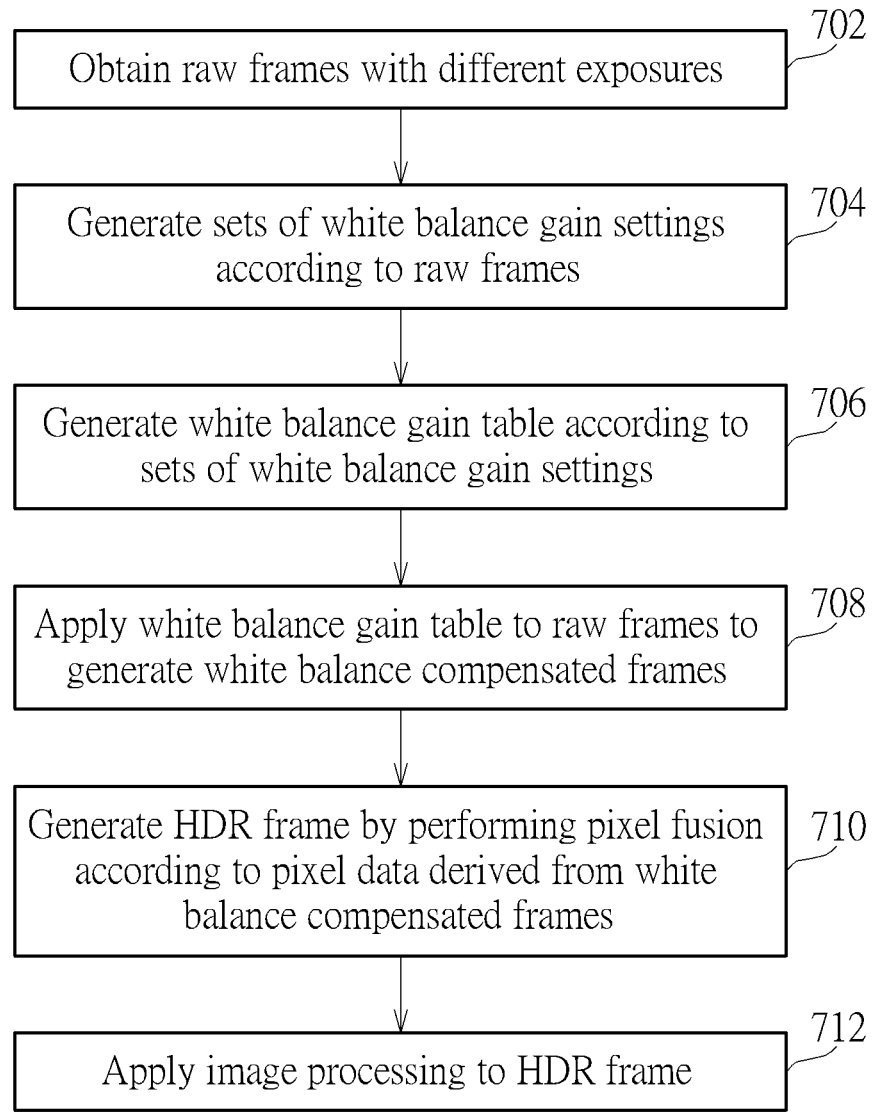
FIG. 7 is a flowchart illustrating a first image processing method according to an embodiment of the present invention.

FIG. 7 is a flowchart illustrating a first image processing method according to an embodiment of the present invention. The image processing method shown in FIG. 7 may be employed by the image processing apparatus 100 shown in FIG. 1. Provided that the result is substantially the same, the steps are not required to be executed in the exact order shown in FIG. 7. At step 702, the white balance gain estimation circuit 102 obtains raw frames with different exposures. At step 704, the white balance gain estimation circuit 102 generates multiple sets of white balance gain settings according to raw frames (which are exposure frames with different exposures). At step 706, the white balance gain estimation circuit 102 generates a white balance gain table according to multiple sets of white balance gain settings. At step 708, the white balance compensation circuit 104 applies the white balance gain table to raw frames to generate white balance compensated frames. At step 710, the pixel fusion circuit 106 generates an HDR frame by performing pixel fusion according to pixel data derived from white balance compensated frames. At step 712, the image processing circuit 108 applies image processing to the HDR frame. Since a person skilled in the pertinent art can readily understand details of each step after reading above paragraphs, further description is omitted here for brevity.

In above embodiments, the proposed apparatus and method are designed to apply a white balance gain table to each exposure frame (raw frame) and then perform pixel fusion upon pixel data derived from white balance compensated frames. However, these are for illustrative purposes only, and are not meant to be limitations of the present invention. In some embodiments, the proposed apparatus and method may be designed to perform pixel fusion upon pixel data derived from exposure frames (raw frames) and then apply a white balance gain table to an HDR frame, or may be designed to apply a white balance gain table to an HDR frame without performing pixel fusion in advance.

Figure 8:
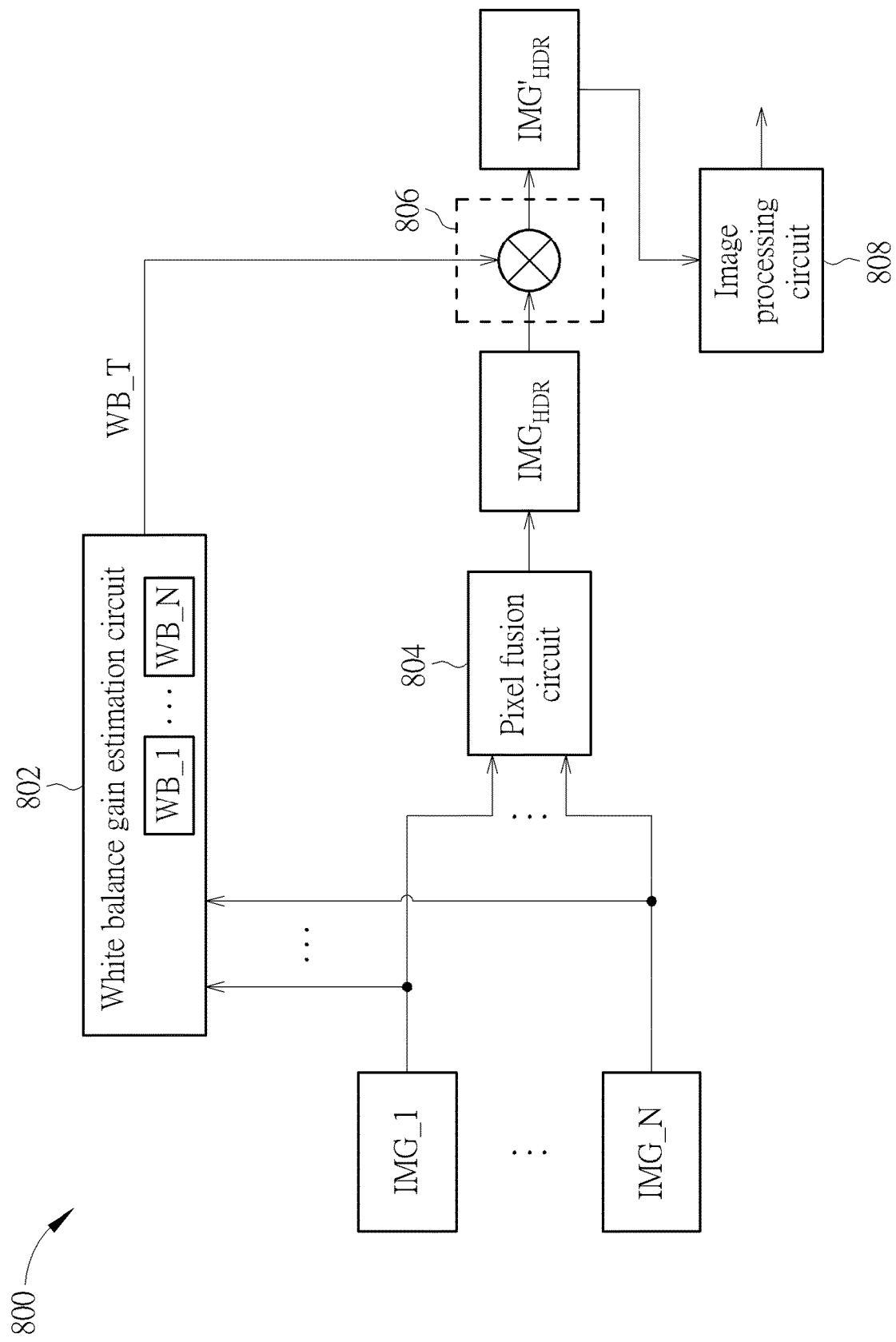
FIG. 8 is a block diagram illustrating a second image processing apparatus according to an embodiment of the present invention.

FIG. 8 is a block diagram illustrating a second image processing apparatus according to an embodiment of the present invention. The image processing apparatus 800 includes a white balance gain estimation circuit 802, a pixel fusion circuit 804, a white balance compensation circuit 806, and an image processing circuit 808. Like the white balance gain estimation circuit 102 shown in FIG. 1, the white balance gain estimation circuit 802 is arranged to analyze a plurality of raw frames with different exposures (e.g., N exposure frames IMG_1-IMG_N with different exposures, where N is a positive integer not smaller than 2) to generate a plurality of sets of white balance gain settings (e.g., N sets of white balance gain settings WB_1-WB_N), and combine the sets of white balance gain settings to generate a white balance gain table WB_T, where statistics of different color components (R, G, B) and/or image features in one exposure frame IMG_n (1≤n≤N) may be used for determining a corresponding set of white balance gain settings WB_n. For example, each raw frame may be a 10-bit image with a bit depth equal to 10.

The major difference between the image processing apparatuses 100 and 800 is an order of a pixel fusion circuit and a white balance compensation circuit. As shown in FIG. 8, the pixel fusion circuit 804 is arranged to generate a pixel fusion result (e.g., HDR image $IMG_{HDR}$) by performing pixel fusion according to pixel data derived from the exposure frames IMG_1-IMG_N; and the white balance compensation circuit 806 is arranged to apply the white balance gain table WB_T to an HDR frame (which may be derived from the pixel fusion result such as the HDR frame $IMG_{HDR}$) to generate a white balance compensated HDR frame $IMG'_{HDR}$/where multiple light sources in different intensity are compensated in accordance with the white balance gain table WB_T that is generated from combining multiple sets of white balance gain settings obtained from analyzing respective exposure frames with different exposures. For example, the HDR frame may be an 18-bit image with a bit depth equal to 18, or a 20-bit image with a bit depth equal to 20. In one exemplary design, the white balance compensation circuit 806 may multiple the HDR frame $IMG_{HDR}$ with the white balance gain table WB_T directly. In another exemplary design, the white balance compensation circuit 806 may multiple the HDR frame $IMG_{HDR}$ with the white balance gain table WB_T after the HDR frame $IMG_{HDR}$ undergoes certain image enhancement processing. Like the image processing circuit 108 shown in FIG. 1, the image processing circuit 808 is arranged to deal with the remaining image processing and generate an HDR output of the image processing apparatus 800.

Figure 9:
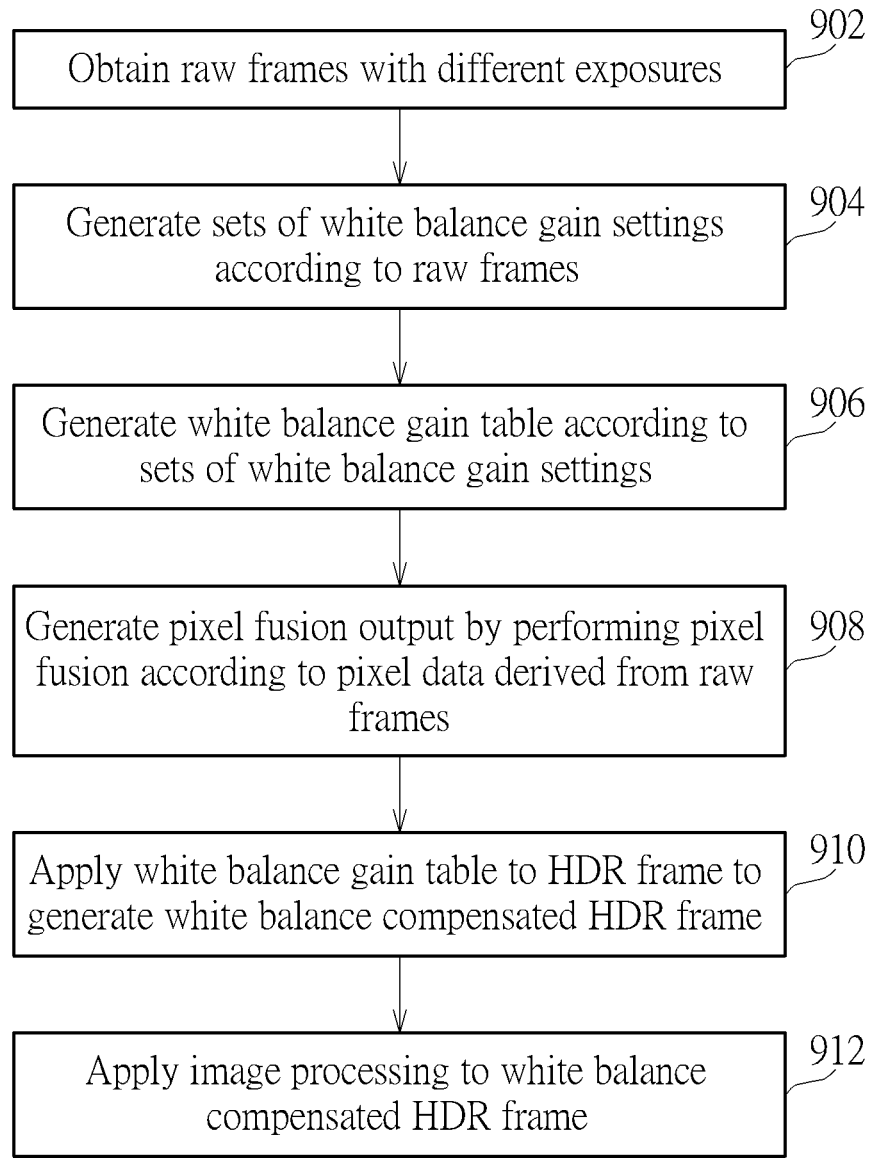
FIG. 9 is a flowchart illustrating a second image processing method according to an embodiment of the present invention.

FIG. 9 is a flowchart illustrating a second image processing method according to an embodiment of the present invention. The image processing method shown in FIG. 9 may be employed by the image processing apparatus 800 shown in FIG. 8. Provided that the result is substantially the same, the steps are not required to be executed in the exact order shown in FIG. 9. At step 902, the white balance gain estimation circuit 802 obtains raw frames with different exposures. At step 904, the white balance gain estimation circuit 802 generates multiple sets of white balance gain settings according to raw frames (which are exposure frames with different exposures). At step 906, the white balance gain estimation circuit 802 generates a white balance gain table according to multiple sets of white balance gain settings. At step 908, the pixel fusion circuit 804 generates a pixel fusion output by performing pixel fusion according to pixel data derived from raw frames. At step 910, the white balance compensation circuit 806 applies the white balance gain table to an HDR frame to generate a white balance compensated HDR frame. At step 912, the image processing circuit 808 applies image processing to the white balance compensated HDR frame. Since a person skilled in the pertinent art can readily understand details of each step after reading above paragraphs, further description is omitted here for brevity.

Figure 10:
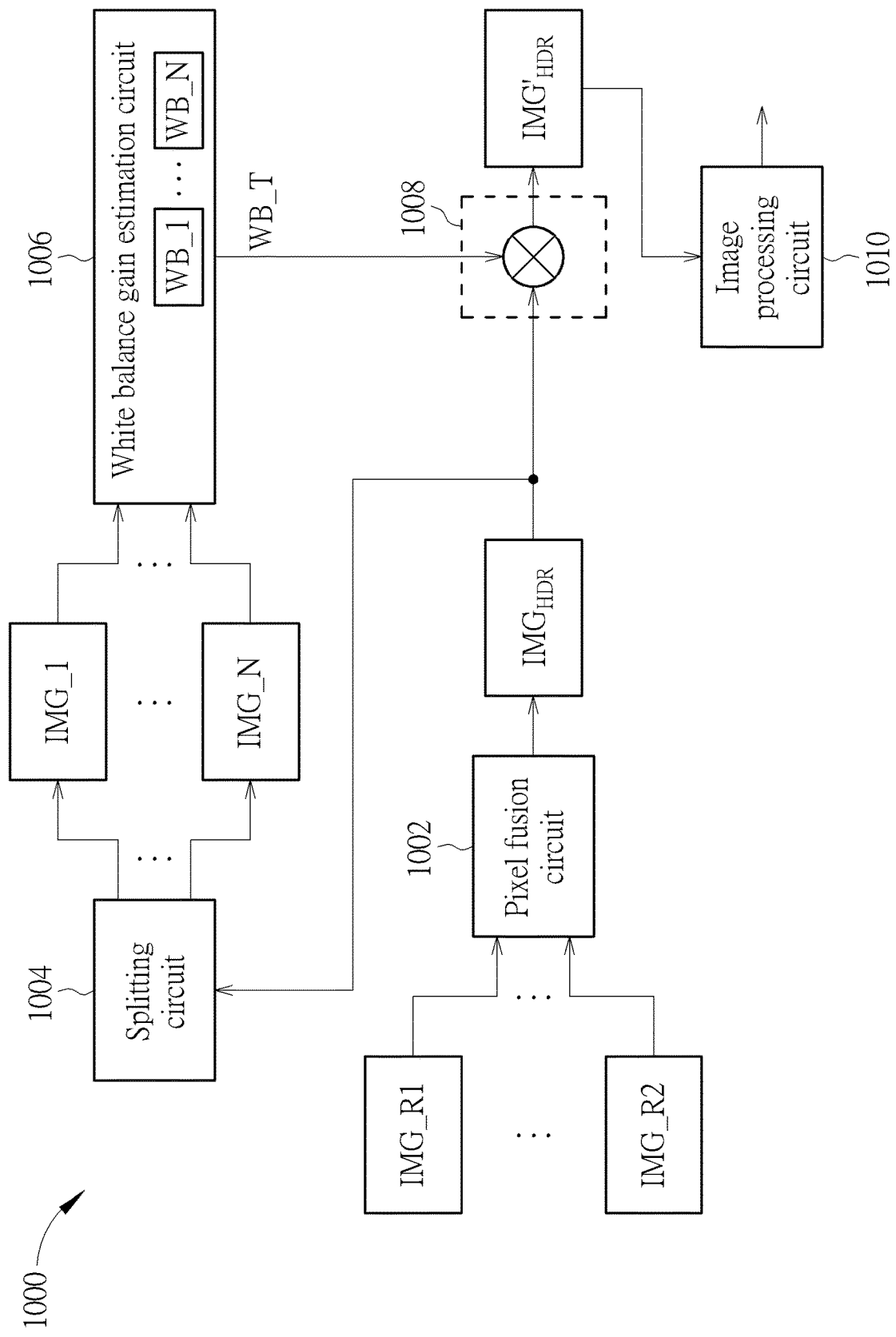
FIG. 10 is a block diagram illustrating a third image processing apparatus according to an embodiment of the present invention.

FIG. 10 is a block diagram illustrating a third image processing apparatus according to an embodiment of the present invention. The image processing apparatus 1000 includes a pixel fusion circuit 1002, a splitting circuit 1004, a white balance gain estimation circuit 1006, a white balance compensation circuit 1008, and an image processing circuit 1010. Like the pixel fusion circuit 804 shown in FIG. 8, the pixel fusion circuit 1002 is arranged to generate a pixel fusion result (e.g., HDR image $IMG_{HDR}$) by performing pixel fusion according to pixel data derived from a plurality of raw frames IMG_R1-IMG_RN with different exposures, where N is a positive integer not smaller than 2. For example, each raw frame is a 10-bit image with a bit depth equal to 10, and the HDR image may be an 18-bit image with a bit 15 depth equal to 18 or a 20-bit image with a bit depth equal to 20. The major difference between the image processing apparatuses 800 and 1000 is that the image processing apparatus 1000 has the splitting circuit 1004 that is arranged to generate a plurality of exposure frames IMG_1-IMG_N with different exposures from splitting a single HDR frame (e.g., HDR image $IMG_{HDR}$). Like the white balance gain estimation circuit 802 shown in FIG. 8, the white balance gain estimation circuit 1006 is arranged to analyze the exposure frames IMG_1-IMG_N to generate a plurality of sets of white balance gain settings (e.g., N sets of white balance gain settings WB_1-WB_N), and combine the sets of white balance gain settings to generate a white balance gain table WB_T, where statistics of different color components (R, G, B) and/or image features in one exposure frame IMG_n (1≤n≤N) may be used for determining a corresponding set of white balance gain settings WB_n.

Like the white balance compensation circuit 806 shown in FIG. 8, the white balance compensation circuit 1008 is arranged to apply the white balance gain table WB_T to an HDR frame (which may be derived from the pixel fusion result such as the HDR frame $IMG_{HDR}$) to generate a white balance compensated HDR frame $IMG'_{HDR}$, where multiple light sources in different intensity are compensated in accordance with the white balance gain table WB_T that is generated from combining multiple sets of white balance gain settings obtained from analyzing respective exposure frames with different exposures. In one exemplary design, the white balance compensation circuit 1008 may multiply the HDR frame $IMG_{HDR}$ with the white balance gain table WB_T directly. In another exemplary design, the white balance compensation circuit 1008 may multiple multiply the HDR frame $IMG_{HDR}$ with the white balance gain table WB_T after the HDR frame $IMG_{HDR}$ undergoes certain image enhancement processing. Like the image processing circuit 808 shown in FIG. 8, the image processing circuit 1010 is arranged to deal with the remaining image processing and generate an HDR output of the image processing apparatus 1000.

Figure 11:
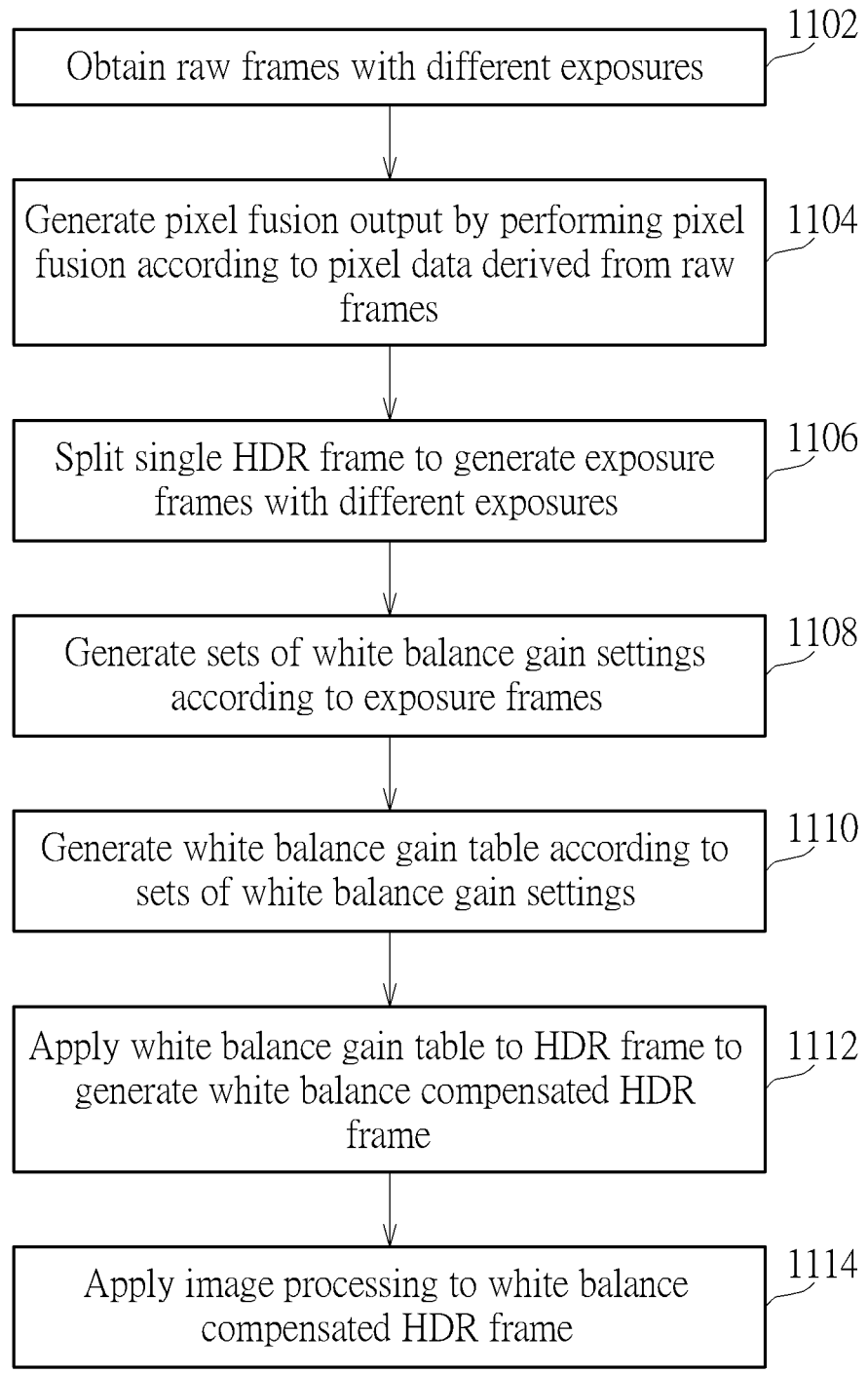
FIG. 11 is a flowchart illustrating a third image processing method according to an embodiment of the present invention.

FIG. 11 is a flowchart illustrating a third image processing method according to an embodiment of the present invention. The image processing method shown in FIG. 11 may be employed by the image processing apparatus 1000 shown in FIG. 10. Provided that the result is substantially the same, the steps are not required to be executed in the exact order shown in FIG. 11. At step 1102, the pixel fusion circuit 1002 obtains raw frames with different exposures. At step 1104, the pixel fusion circuit 1002 generates a pixel fusion output by performing pixel fusion according to pixel data derived from raw frames. At step 1106, the splitting circuit 1004 splits a single HDR frame to generate exposure frames with different exposures. At step 1108, the white balance gain estimation circuit 1006 generates multiple sets of white balance gain settings according to exposure frames. At step 1110, the white balance gain estimation circuit 1006 generates a white balance gain table according to multiple sets of white balance gain settings. At step 1112, the white balance compensation circuit 1008 applies the white balance gain table to an HDR frame to generate a white balance compensated HDR frame. At step 1114, the image processing circuit 1010 applies image processing to the white balance compensated HDR frame. Since a person skilled in the pertinent art can readily understand details of each step after reading above paragraphs, further description is omitted here for brevity.

Figure 12:
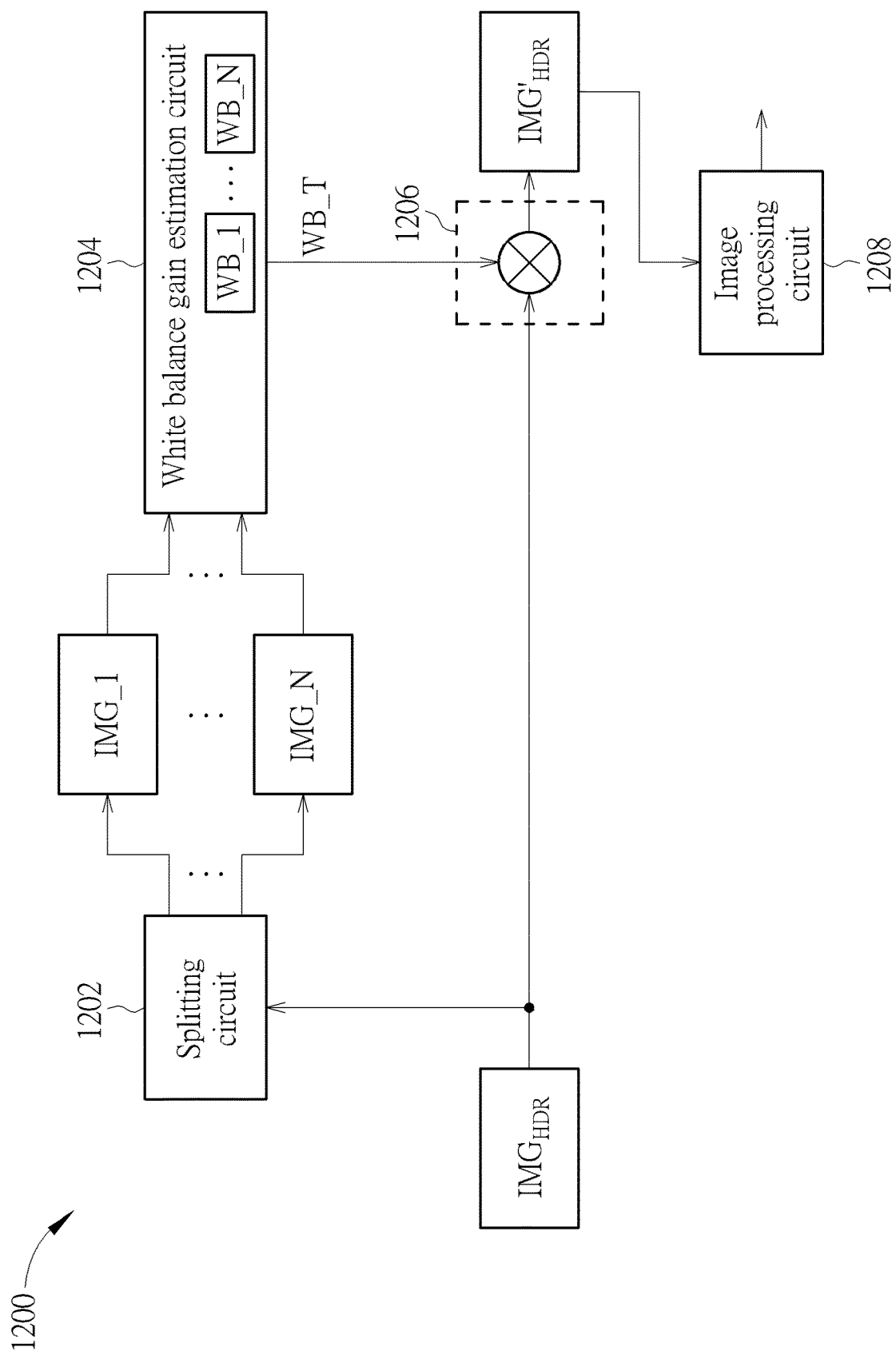
FIG. 12 is a block diagram illustrating a fourth image processing apparatus according to an embodiment of the present invention.

FIG. 12 is a block diagram illustrating a fourth image processing apparatus according to an embodiment of the present invention. The image processing apparatus 1200 includes a splitting circuit 1202, a white balance gain estimation circuit 1204, a white balance compensation circuit 1206, and an image processing circuit 1208. The major difference between the image processing apparatuses 1000 and 1200 is that no pixel fusion circuit is required by the image processing apparatus 1200. Specifically, since a raw frame input of the image processing apparatus 1200 is already an HDR frame $IMG_{HDR}$ derived from an HDR image sensor output, no pixel fusion is needed for combining multiple exposure frames with different exposures for HDR frame generation. For example, the HDR frame may be an 18-bit image with a bit depth equal to 18, or a 20-bit image with a bit depth equal to 20. Like the splitting circuit 1004 shown in FIG. 10, the splitting circuit 1202 is arranged to generate a plurality of exposure frames IMG_1-IMG_N with different exposures from splitting a single HDR frame $IMG_{HDR}$, where N is a positive integer not smaller than 2. Like the white balance gain estimation circuit 1006 shown in FIG. 10, the white balance gain estimation circuit 1204 is arranged to analyze the exposure frames IMG_1-IMG_N to generate a plurality of sets of white balance gain settings (e.g., N sets of white balance gain settings WB_1-WB_N), and combine the sets of white balance gain settings to generate a white balance gain table WB_T, where statistics of different color components (R, G, B) and/or image features in one exposure frame IMG_n (1≤n≤N) may be used for determining a corresponding set of white balance gain settings WB_n.

Like the white balance compensation circuit 1008 shown in FIG. 10, the white balance compensation circuit 1206 is arranged to apply the white balance gain table WB_T to an HDR frame (which may be derived from the single HDR frame $IMG_{HDR}$) to generate a white balance compensated HDR frame $IMG'_{HDR}$/where multiple light sources in different intensity are compensated in accordance with the white balance gain table WB_T that is generated from combining multiple sets of white balance gain settings obtained from analyzing respective exposure frames with different exposures. In one exemplary design, the white balance compensation circuit 1206 may multiply the HDR frame $IMG_{HDR}$ with the white balance gain table WB_T directly. In another exemplary design, the white balance compensation circuit 1206 may multiply the HDR frame $IMG_{HDR}$ with the white balance gain table WB_T after the HDR frame $IMG_{HDR}$ undergoes certain image enhancement processing. Like the image processing circuit 1010 shown in FIG. 10, the image processing circuit 1208 is arranged to deal with the remaining image processing and generate an HDR output of the image processing apparatus 1200.

Figure 13:
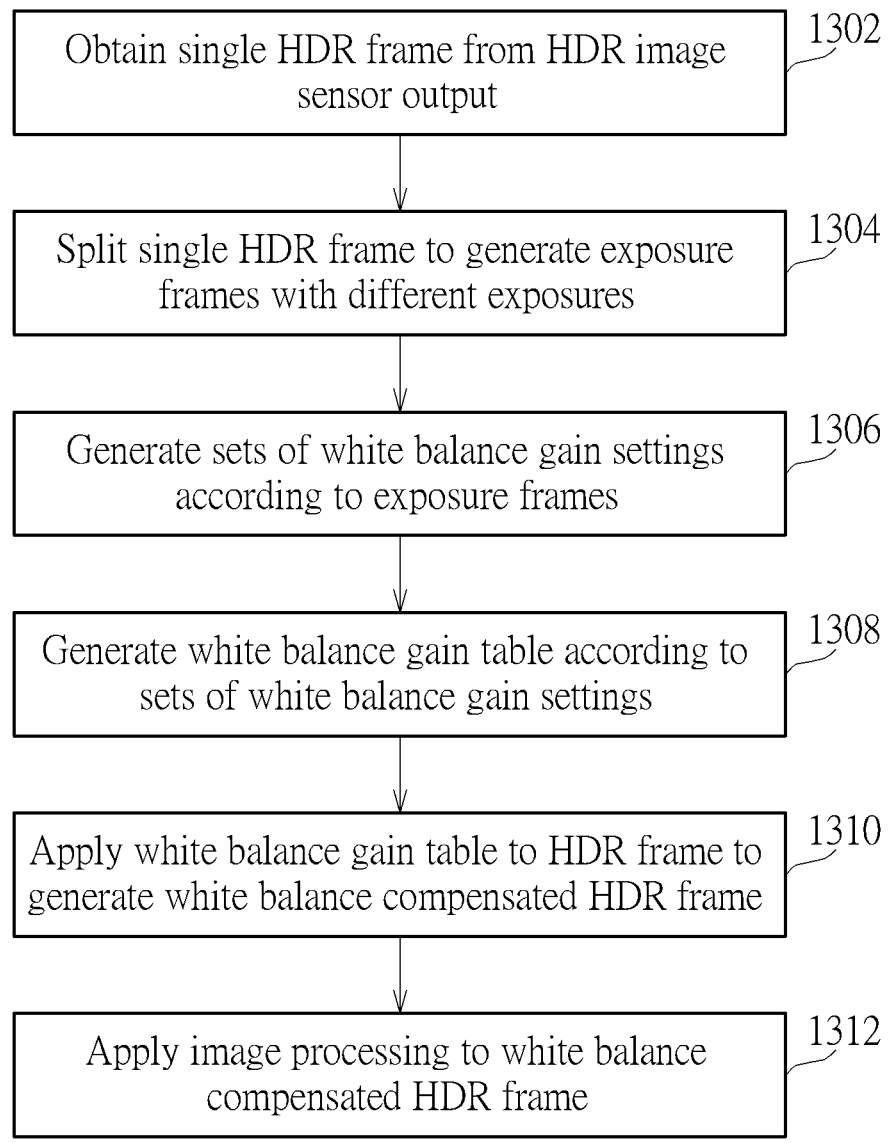
FIG. 13 is a flowchart illustrating a fourth image processing method according to an embodiment of the present invention.

FIG. 13 is a flowchart illustrating a fourth image processing method according to an embodiment of the present invention. The image processing method shown in FIG. 13 may be employed by the image processing apparatus 1200 shown in FIG. 12. Provided that the result is substantially the same, the steps are not required to be executed in the exact order shown in FIG. 13. At step 1302, the splitting circuit 1202 obtains a single HDR frame from an HDR image sensor output. At step 1304, the splitting circuit 1202 splits the single HDR frame to generate exposure frames with different exposures. At step 1306, the white balance gain estimation circuit 1204 generates multiple sets of white balance gain settings according to exposure frames. At step 1308, the white balance gain estimation circuit 1204 generates a white balance gain table according to multiple sets of white balance gain settings. At step 1310, the white balance compensation circuit 1206 applies the white balance gain table to an HDR frame to generate a white balance compensated HDR frame. At step 1312, the image processing circuit 1208 applies image processing to the white balance compensated HDR frame. Since a person skilled in the pertinent art can readily understand details of each step after reading above paragraphs, further description is omitted here for brevity.

Figure 14:
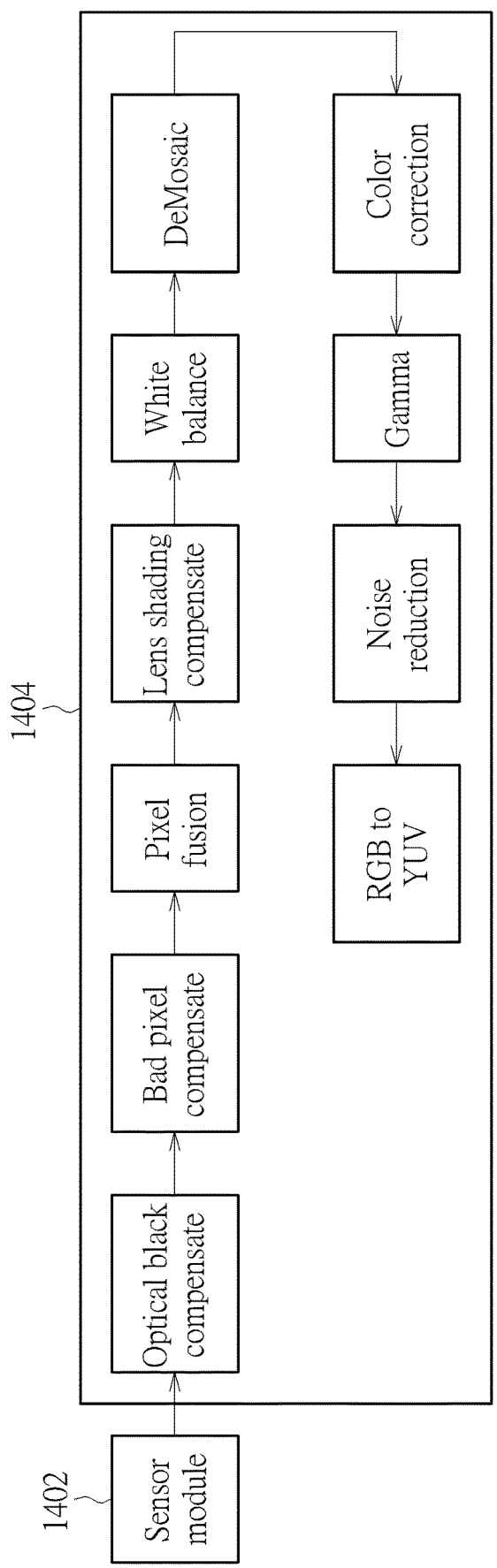
FIG. 14 is a diagram illustrating an image processing pipeline having a pixel fusion block and a white balance block according to an embodiment of the present invention.

Each of the aforementioned image processing apparatuses 100, 800, 1000, 1200 may be integrated in an image processing pipeline for a particular application. FIG. 14 is a diagram illustrating an image processing pipeline having a pixel fusion block and a white balance block according to an embodiment of the present invention. The image processing pipeline 1404 receives a frame input from a sensor module 1402, and has a plurality of pipeline stages, including an optical black compensation block (labeled as "Optical black compensate"), a bad pixel compensation block (labeled as "Bad pixel compensate"), a pixel fusion block (labeled as "Pixel fusion"), a lens shading compensation block (labeled as "Lens shading compensate"), a white balance block (labeled as "White balance"), a DeMosiac block (labeled as "De-Mosaic"), a color correction block (labeled as "Color correction"), a gamma correction block (labeled as "Gamma"), a noise reduction block (labeled as "Noise reduction"), and an RGB-to-YUV conversion block (labeled as RGB to YUV). For example, the pixel fusion block may include the pixel fusion circuit 804/1002, and the white balance block may include the white balance gain estimation circuit 802/1006 and the white balance compensation circuit 806/1008. The image processing pipeline 1404 shown in FIG. 14 is for illustrative purposes only, and is not meant to be a limitation of the present invention. In practice, any image processing pipeline design using the proposed image processing apparatus 100/800/1000/1200 falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:
generating a plurality of exposure frames with different exposures from splitting a single high dynamic range (HDR) frame;
analyzing, by a white balance gain estimation circuit, the plurality of exposure frames with the different exposures to generate a plurality of sets of white balance gain settings;
combining the plurality of sets of white balance gain settings to generate a white balance gain table; and
applying the white balance gain table to an HDR frame to generate a white balance compensated HDR frame, wherein the single HDR frame directly acts as the HDR frame to which the white balance gain table is applied, or the HDR frame to which the white balance gain table is applied is obtained from applying image processing to the single HDR frame.

2. The image processing method of claim 1, further comprising:
generating the single HDR frame by performing pixel fusion according to pixel data derived from a plurality of frames with different exposures.

3. The image processing method of claim 1, wherein the analyzing the plurality of exposure frames with the different exposures to generate the plurality of sets of white balance gain settings comprises:
for an exposure frame included in the plurality of exposure frames, obtaining statistics of different color components in the exposure frame, and generating a set of white balance gain settings according to the statistics of different color components in the exposure frame.

4. The image processing method of claim 1, wherein the analyzing the plurality of exposure frames with the different exposures to generate the plurality of sets of white balance gain settings comprises:
for an exposure frame included in the plurality of exposure frames, performing feature extraction upon the exposure frame to obtain features in the exposure frame, and generating a set of white balance gain settings according to the features in the exposure frame.

5. An image processing apparatus comprising:
a white balance gain estimation circuit, arranged to analyze a plurality of exposure frames with different exposures to generate a plurality of sets of white balance gain settings, and combine the plurality of sets of white balance gain settings to generate a white balance gain table;
a splitting circuit, arranged to generate the plurality of exposure frames with the different exposures from splitting a single high dynamic range (HDR) frame; and
a white balance compensation circuit, arranged to apply the white balance gain table to an HDR frame to generate a white balance compensated HDR frame, wherein the single HDR frame directly acts as the HDR frame to which the white balance gain table is applied, or the HDR frame to which the white balance gain table is applied is obtained from applying image processing to the single HDR frame.

6. The image processing apparatus of claim 5, further comprising:
   a pixel fusion circuit, arranged to generate the single HDR frame by performing pixel fusion according to pixel data derived from a plurality of frames with different exposures.

7. The image processing apparatus of claim 5, wherein for an exposure frame included in the plurality of exposure frames, the white balance gain estimation circuit obtains statistics of different color components in the exposure frame, and generates a set of white balance gain settings according to the statistics of different color components in the exposure frame.

8. The image processing apparatus of claim 5, wherein for an exposure frame included in the plurality of exposure frames, the white balance gain estimation circuit performs feature extraction upon the exposure frame to obtain features in the exposure frame, and generates a set of white balance gain settings according to the features in the exposure frame.

\* \* \* \* \*